(12) United States Patent
Sheaffer

(10) Patent No.: US 7,454,601 B2
(45) Date of Patent: Nov. 18, 2008

(54) N-WIDE ADD-COMPARE-SELECT INSTRUCTION

(75) Inventor: Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 411 days.

(21) Appl. No.: 10/107,259

(22) Filed: Mar. 28, 2002

(65) Prior Publication Data

US 2003/0188142 A1    Oct. 2, 2003

(51) Int. Cl.
*G06F 9/315* (2006.01)
*G06F 9/42* (2006.01)
*H03M 13/41* (2006.01)

(52) U.S. Cl. .................. 712/235; 712/227; 714/795; 714/796

(58) Field of Classification Search .............. 712/213, 712/221, 223, 227, 234, 235; 714/792, 795, 714/796
See application file for complete search history.

(56) References Cited

U.S. PATENT DOCUMENTS

| | | | | |
|---|---|---|---|---|
| 4,932,029 A | * | 6/1990 | Heichler | 714/796 |
| 5,220,570 A | * | 6/1993 | Lou et al. | 714/791 |
| 5,327,440 A | * | 7/1994 | Fredrickson et al. | 714/795 |
| 6,397,240 B1 | * | 5/2002 | Fernando et al. | 708/603 |
| 6,848,074 B2 | * | 1/2005 | Coombs | 714/795 |
| 2002/0031195 A1 | * | 3/2002 | Honary | 375/341 |

* cited by examiner

*Primary Examiner*—Daniel Pan
(74) *Attorney, Agent, or Firm*—Kenyon & Kenyon LLP

(57) ABSTRACT

The present invention relates to a method and system for providing an N-wide add-compare-select instruction includes decoding an instruction as an N-wide add-compare-select instruction and selecting a plurality of branch metrics. The method also includes combining the plurality of branch metrics with a plurality of source operands and outputting a pair of maximum values.

26 Claims, 4 Drawing Sheets

N-WIDE ADD-COMPARE-SELECT INSTRUCTION

FIELD OF THE INVENTION

The present invention relates to processor architectures and instruction sets, and in particular, to processor architectures with instruction sets that provide N-wide add-compare-select instructions.

BACKGROUND

In modern processors, execution of instructions occurs, in general, in the following sequential order: the processor reads an instruction, a decoder in the processor decodes the instruction, and, then, the processor executes the instruction. In older processors the clock speed of the processor was generally slow enough that the reading, decoding and executing of each instruction could occur in a single clock cycle. However, modern microprocessors have improved performance by going to shorter clock cycles (that is, higher frequencies). These shorter clock cycles tend to make instructions require multiple, smaller sub-actions that can fit into the cycle time. Executing many such sub-actions in parallel, as in a pipelined and/or super-scalar processor, can improve performance even further. For example, although the cycle time of a present-day processor is determined by a number of factors, the cycle time is, generally, determined by the number of gate inversions that need to be preformed during a single cycle. Ideally, the execute stage determines the cycle time. However, in reality, this is not always the case. With the desire to operate at high frequency, the execute stage can be performed across more than one cycle, since it is an activity that can be pipelined. In a large number of workloads the added latency caused by the additional cycle(s) has only a small impact on processor performance. The ultimate goal of many systems is to be able to complete the execution of as many instructions as quickly and as efficiently as possible without adversely impacting the cycle time of the processor.

One way to increase the number of instructions, or equivalent instructions, that can be executed is to create a single instruction that can perform work that currently can only be accomplished by using multiple instructions without causing any timing problems during the execute phase. An instruction of this type can be especially effective in performing N-wide add-compare-select operations.

DETAILED DESCRIPTION

Figure 1:
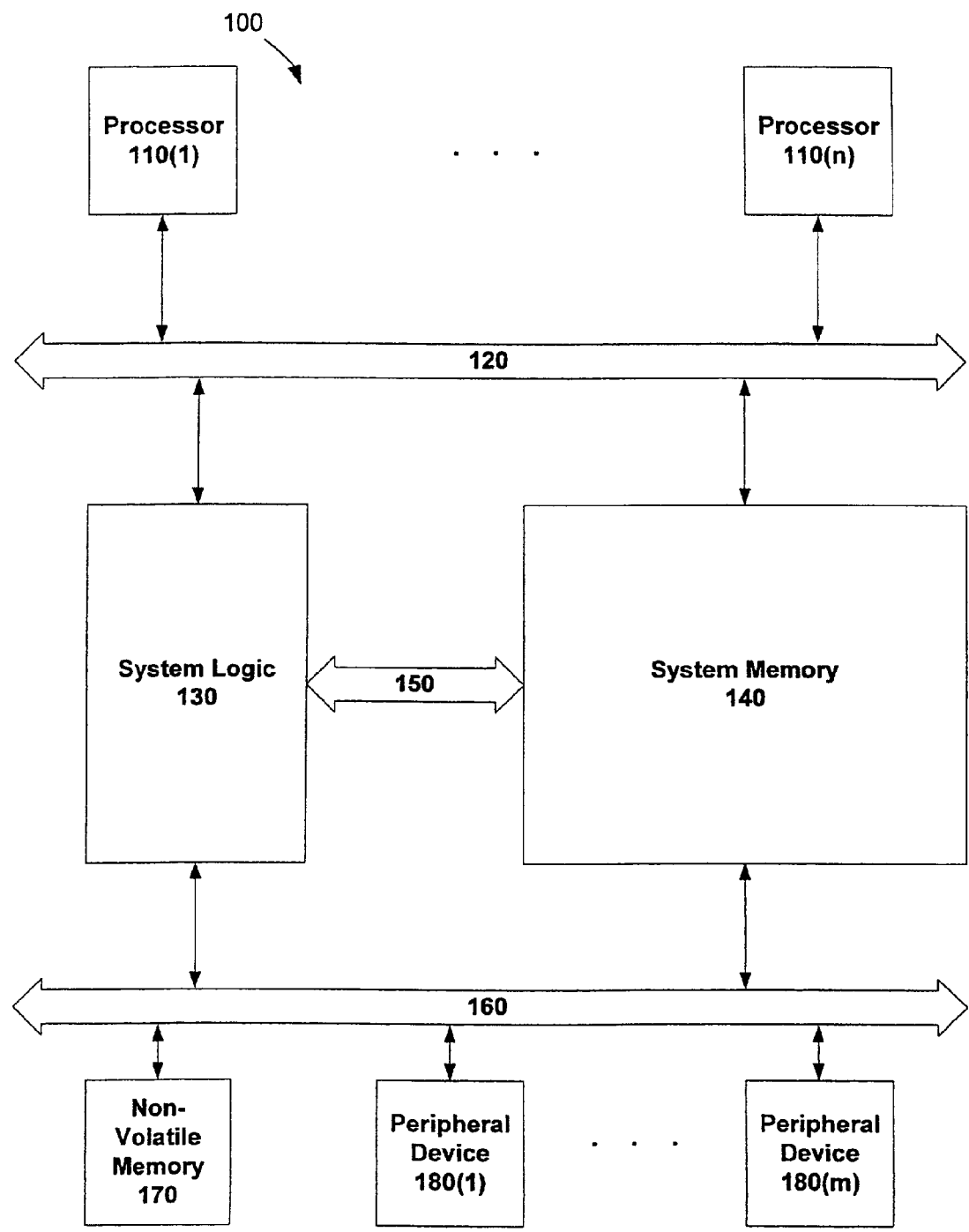
FIG. 1 is a block diagram of a computer system that includes an architectural state including one or more processors, registers and memory, in accordance with an embodiment of the present invention.

In accordance with an embodiment of the present invention, an N-wide add-compare-select instruction may be implemented to execute in two (2) cycles using 3:1 adders and 2:1 MAX blocks to perform the N-wide add-compare-select operation, where N specifies the number of data items that may fit into the execution unit data path, for example, N=8 bytes in a 64 bit data path. In accordance with an embodiment of the present invention, a quad add-compare-select instruction may be implemented using a plurality of 3:1 adders in a first pipe stage and at least four (4) 2:1 MAX blocks in a second pipe stage to perform the quad add-compare-select operation. The instruction may operate in a fully pipelined manner (a throughput of one instruction every cycle) and may produce a result after two (2) cycles. The instruction also may use a number of special purpose registers to determine the operand selection, determine branch metrics and polarity, and collect flags generated during instruction execution. The definitions of these special purpose registers are specified below merely to illustrate one possible embodiment of the present invention. Likewise, the instructions also may produce and store multiple flags into one or more of the special purpose registers. In other embodiments of the present invention, the instruction also may produce the result after one (1) cycle and/or three (3) or more cycles.

In accordance with an embodiment of the present invention, the basic hardware that may be used by the quad add-compare-select instructions may include 8-bit and/or 16-bit adders and/or MAX blocks, which may be fitted easily in a single cycle of any processor. This is especially true if the processor on which the instructions are running operates on higher precision data types such as 32-bit and/or 64-bit integers and floating point numbers. For example, in accordance with an embodiment of the present invention, in a processing core having a 32-bit data path and 32-bit registers, since the adders and/or MAX blocks are of lower computational complexity, a 3:1, 16-bit adder and/or a 2:1 MAX block may be implemented in each execute stage without impacting the cycle time of the processor.

In addition, implementing the whole operation in a single instruction may provide a significant savings in the pipeline front-end instruction supply requirements, since the functionality of multiple instructions may be packed into a single instruction without causing any timing problems during the execute stage.

Similarly, the quad add-compare-select instruction may provide for significant data reuse, since the input operands are used multiple times in the same instruction. In contrast, to achieve the same functionality using currently available instructions would require, each operand to be read from memory or a register file between three (3) to six (6) times.

The impact of the quad add-compare-select instruction on overall performance can be significant. For example, in accordance with an embodiment of the present invention, the quad add-compare-select instruction may reduce the latency required for performing the same operation with current instructions by a factor of up to 10, thus, enabling a significant speedup of applications using this instruction. Specifically, the instruction may enable significant speedup of the execution of a large class of applications, for example, applications for modems, speech and video.

FIG. 1 is a block diagram of a computer system, which includes an architectural state, including one or more processors, registers and memory, in accordance with an embodiment of the present invention. In FIG. 1, a computer system 100 may include one or more processors 110(1)-110(n) coupled to a processor bus 120, which may be coupled to a system logic 130. Each of the one or more processors 110(1)-110(n) may be N-bit processors and may include a decoder (not shown) and one or more N-bit registers (not shown). System logic 130 may be coupled to a system memory 140 through bus 150 and coupled to a non-volatile memory 170 and one or more peripheral devices 180(1)-180(m) through a peripheral bus 160. Peripheral bus 160 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sept. 23, 1998; and comparable peripheral buses. Non-volatile memory 170 may be a static memory device such as a read only memory (ROM) or a flash memory. Peripheral devices 180(1)-180(m) may include, for example, a keyboard; a mouse or other pointing devices; mass storage devices such as hard disk drives, compact disc (CD) drives, optical disks, and digital video disc (DVD) drives; displays and the like.

Figure 2:
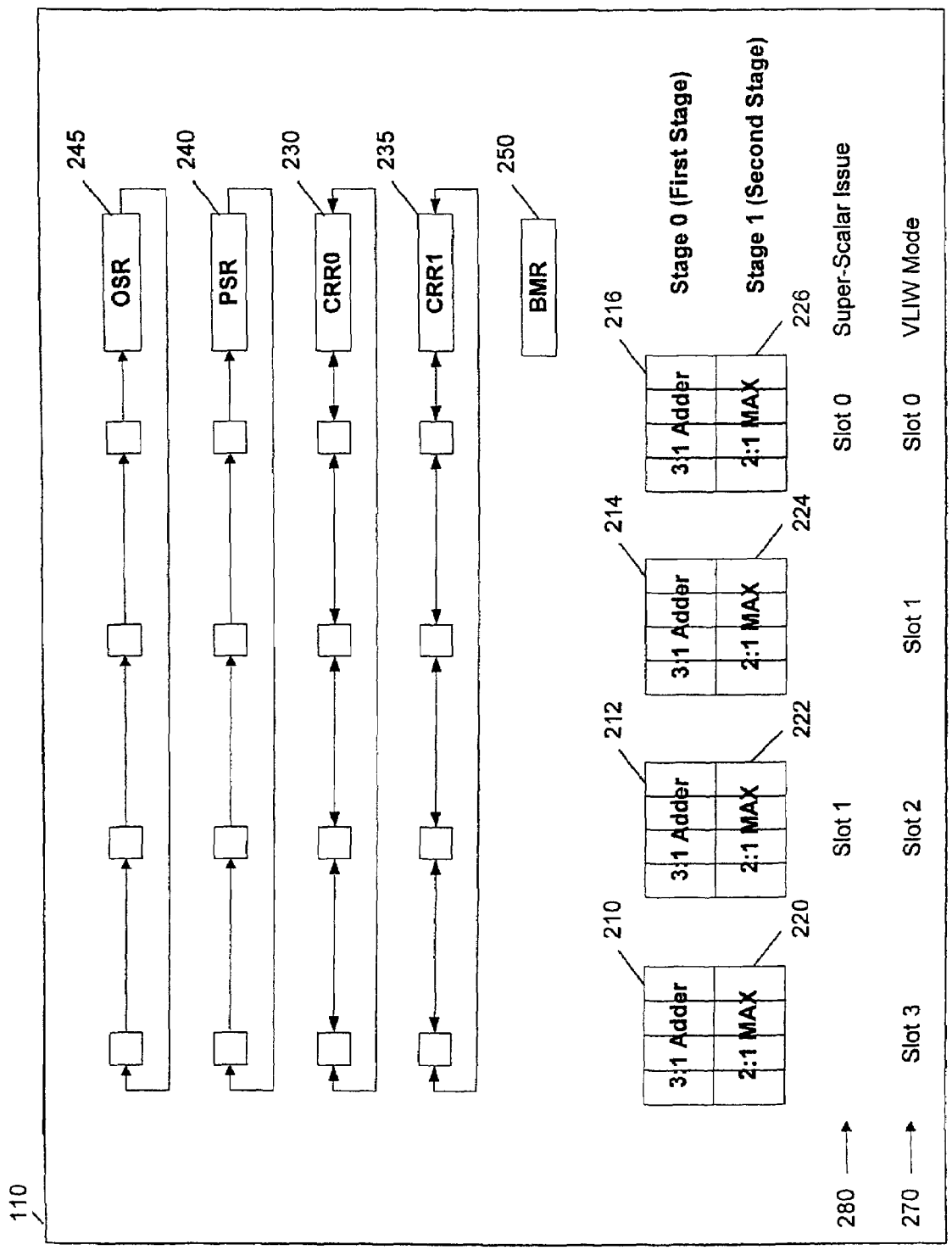
FIG. 2 is an exemplary structure of a processing core of the computer of FIG. 1 having a super-scalar and/or Very Long Instruction Word (VLIW) issue with multiple 3:1 adders implemented in two consecutive execute stages, in accordance with an embodiment of the present invention.

FIG. 2 is an exemplary structure of processor 110 of the computer of FIG. 1 having a super-scalar and/or Very Long Instruction Word (VLIW) issue with multiple 3:1 adders 210, 212, 214 and 216 and multiple 2:1 MAX blocks 220, 222, 224 and 226 implemented in 2 consecutive execute stages, in accordance with an embodiment of the present invention. Processor 110 also may include several common registers including, for example, Compare Result Registers (CRR0, CRR1) 230, 235, a polarity setting register (PSR) 240, an Operand Selection Register (OSR) 245 and a Branch Metric Register (BMR) 250. CRR0 230 and CRR1 235 may be implemented as shift-registers into which any and/or all of the arithmetic flags generated in a cycle may be shifted. For example, when performing Viterbi or Turbo decoding, the results may be shifted, in parallel into both of the CRR registers 230, 235. If more than one instruction causing a shift is issued to one of the CRR registers 230, 235 in the same cycle, the CRR registers 230, 235 may be shifted by the sum of the number of bits from each instruction causing the shifts.

For example, all of the instructions consuming the contents of one of the CRR registers (CRR0 230 and CRR1 235) may conditionally shift the CRR register used after reading the relevant bits out of the CRR register used. In contrast, all of the instructions modifying the contents of the CRR registers may shift the bits of the CRR register used before updating that CRR register. For example, in accordance with an embodiment of the present invention, if needed, CRR0 230 may be used for collecting flags generated by the first stage of execution, and for providing flags to the first execution stage. Likewise, CRR1 235 may be used for collecting flags generated by the second stage of execution, and for providing flags to the second execution stage. Using CRR0 230 for the first stage flags and CRR1 235 for the second stage flags enables instructions that are writing to and/or reading from CRR0 230 and/or CRR1 235 to execute back-to-back, that is, in consecutive cycles, without conflict. In accordance with embodiments of the present invention, although CRR0 230 may not be used by the quad add-compare-select instruction, CRR0 230 is shown to maintain consistency with other related instructions in which CRR0 230 is used to collect result bits from and provide the result bits for the first execution stage. It may also be possible to have a processor 10 with only CRR0 230 and use CRR0 230 to store the result bits from the second execution stage. However, if only CRR0 230 is used to store the second stage result bits, steps must be taken to ensure that the second stage result bits stored in 230 can be made available to other instructions that may be erroneously attempting to access the second stage result bits from another CRR register, for example, CRR1 235.

In accordance with an embodiment of the present invention, PSR 240 may be implemented as a 32-bit register to control the polarity of the input operands. When the PSR option is set in an instruction, the value of the bits in PSR 240 may control the polarity of the BMR byte operands in the instruction. Similar to CRR0 230 and CRR1 235, PSR 240 may be conditionally rotated when bits in PSR 240 are consumed by instructions that use PSR 240. If more than one instruction is causing PSR 240 to rotate in the same cycle, PSR 240 may be rotated by the sum of the number of bits consumed by the instructions causing the rotation.

In accordance with an embodiment of the present invention, th OSR 245 may be implemented as a 32-bit register to control which item out of the BMR bytes is to be selected as an input operand for the operation performed by instructions that use this register. OSR 245 also may be conditionally rotated when bits in OSR 245 are consumed by instructions that use it. Using this separation of labor in the definition of instructions enables dispatching instructions consuming and producing PSR 240 and OSR 245 registers to execute back-to-back, that is, in consecutive cycles without conflict.

In accordance with an embodiment of the present invention, BMR 250 may be a 32-bit register containing four (4) byte values. In general, the byte values may be either four (4) different branch metrics for 3:1 encoding and/or encoding of forward error correction codes or two (2) pairs of branch metrics, for example, SUM and/or DIFF, for 2:1 encoding.

In accordance with an embodiment of the present invention, the quad add-compare-select instruction may use the polarity control bits from PSR 240, the selection control bits from OSR 245 and may use/update CRR1 235 bits based on the issue slot in which the instruction is executed. For example, for an instruction number, I, I may be $\epsilon\{0,1\}$ in Super-scalar mode, and I may be $\epsilon\{0,1,2,3\}$ in VLIW mode, where only the adder issue slots 270 and 280 are considered.

In order to minimize the amount of connectivity required to steer bits into and out of CRR1 235, PSR 240 and OSR 245, the instructions using PSR 240, CRR register 235 and OSR 250, in general, may be packed into the lower issue slots. This means that if N such instructions are issued, they would occupy issue slots 0 to N-1. This restriction, generally, can be easily enforced in VLIW mode, for example, in the four (4) issue slots 270 in FIG. 2. Unfortunately, in super-scalar mode it can be harder to enforce, and occasionally may cause the processor 110 to stall. However, in FIG. 2, in super-scalar mode, if there are only two (2) issue slots 280, it may be easier to provide the required connectivity to enable issuing a single instruction using these registers into slot 1 rather than slot 0.

The quad add-compare-select instruction may be described in the context of processor 110 having a Super-Scalar issue and/or a VLIW issue. For example, in accordance with an embodiment of the present invention, the data type may be assumed to be 16-bits and the processing core can be assumed to have a 32-bit data path and 32-bit registers. However, it should be clearly understood that this example is merely illustrative and in no way intended to limit the scope of the present invention, since the data type and processing core can be of any other precision either below or above the 16-bit data type:32-bit processor core, for example, 8-bit:32-bit,16-bit: 64-bit, and/or 32-bit:128-bit.

Figure 3:
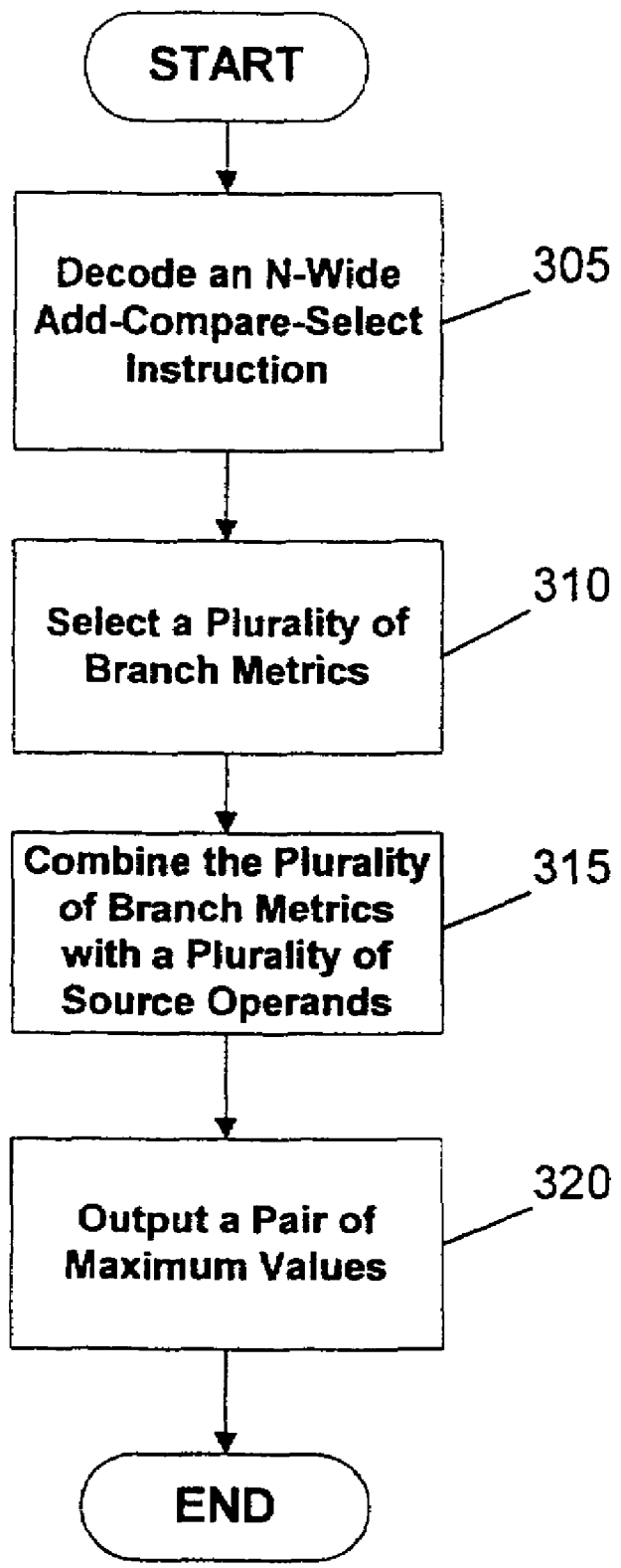
FIG. 3 is a top-level flow diagram of a method for providing an N-wide add-compare-select instruction in a processor, in accordance with an embodiment of the present invention.

FIG. 3 is a top-level flow diagram of a method for providing an N-wide add-compare-select instruction in a processor, in accordance with an embodiment of the present invention. In FIG. 3, an instruction may be decoded 305 as a quad add-compare-select instruction. A plurality of branch metrics may be selected 310. The selected plurality of branch metrics may be combined 315 (that is, added and/or subtracted) with a plurality of source operands, in predetermined orders, to obtain a plurality of results. A pair of maximum values from the results may be stored 320.

In accordance with an embodiment of the present invention, the method of FIG. 3 may be performed in processor 110 of FIG. 2 in two (2) cycles. In FIG. 3, the decoding 305 and selecting 310 operations may occur in a first cycle and the adding/subtracting 315 and storing 320 operations may occur in a second cycle. In accordance with other embodiments of the present invention, the method of FIG. 3 also may be performed in one (1) cycle as well as three (3) or more cycles. In accordance with an embodiment of the present invention, the instruction may be used for a third phase of Turbo decoding and general Vertebi and the instruction may be controlled by a Decode Control Register (DCR).

In accordance with an embodiment of the present invention, a quad add-compare-select instruction may be implemented to combine two (2) input values into one (1) result. Specifically, the generic syntax of the quad add-compare-select instruction may be represented by:

[CRR] [UCR] destR=QACS(srcA, srcB) [LLR1|LLR2]

where the square brackets ([ ]) denote the optional instruction parameters that are not required for execution of the instruction, (|) separates alternative variables that may be set, and [VAR 1|VAR2] indicates that either VAR1 or VAR2 or neither may be set.

Setting the Update Control Register (UCR) variable to TRUE may cause the instruction to rotate OSR 245 of FIG. 2 four (4) bits to the right and rotate PSR 240 of FIG. 2 two (2) bits to the right. Setting the CRR variable to TRUE may cause the instruction to accumulate condition codes into at least one of the CRR registers, for example, in accordance with an embodiment of the present invention, CRR1 register 235 of FIG. 2. Similarly, setting one of a LLR1 variable and a LLR2 variable to TRUE may cause the instruction to perform alternative additions for use in the third stage of Turbo decoding.

In accordance with an embodiment of the present invention, the instructions described below, generally, may be completely executed over two (2) processor clock cycles. However, it should be clearly understood that the instructions also may be implemented to be executed over a single clock cycle as well as over three (3) or more clock cycles. In the following examples, the syntax used may include variables such as signal' and signal ", which are delayed versions of a variable signal by one and two cycles, respectively.

In accordance with an embodiment of the present invention, the functionality of the quad add-compare-select instruction may be defined by the following C-style pseudo-code example:

```
First cycle:
    Select the relevant branch metrics
    bmb0 = 8* OSR[4i+1, ri]       //start bit for BMR byte for 1st
                                  butterfly
    bm0 = BMR[bmb0+7:bmb0]*{PSR[2i]? -1:1}
    bmb1 = 8* OSR[4i+3, 4i+2]     //start bit for BMR byte for 2nd
                                  butterfly
    bm1 = BMR[bmb1+7:bmb1*]{PSR[2i+1]? -1:1}
    if UCR {
        rotate OSR right by 4
        rotate PSR right by 2
    }
    Perform 4 additions
    If LLR1 {
        tmp00 = srcA.1 + srcB.1 + bm0
        tmp01 = srcA.h + srcB.h + bm0
```

-continued

```
        tmp10 = srcA.1 + srcB.h + bm1
        tmp11 = srcA.h + srcB.1 + bm1
    }
    else if LLR2 {
        tmp00 = srcA.1 + srcB.h + bm0
        tmp01 = srcA.h + srcB.1 + bm0
        tmp10 = srcA.1 + srcB.1 + bm1
        tmp11 = srcA.h + srcB.h + bm1
    }
    else {
        tmp00 = srcA.1 + bm0
        tmp01 = srcA.h − bm0
        tmp10 = srcB.1 + bm1
        tmp11 = srcB.h − bm1
    }
Second cycle:
    Perform max operation
    destR = {MAX(tmp10', tmp11'), (MAX (tmp00', tmp01')}
    Update CRR
    if CRR {
    Shift CRR1 left by 2
    CRR1[2i]     = tmp00' > tmp01'
    CRR1[2i+1]   = tmp10' > tmp11'
    }
```

Figure 4:
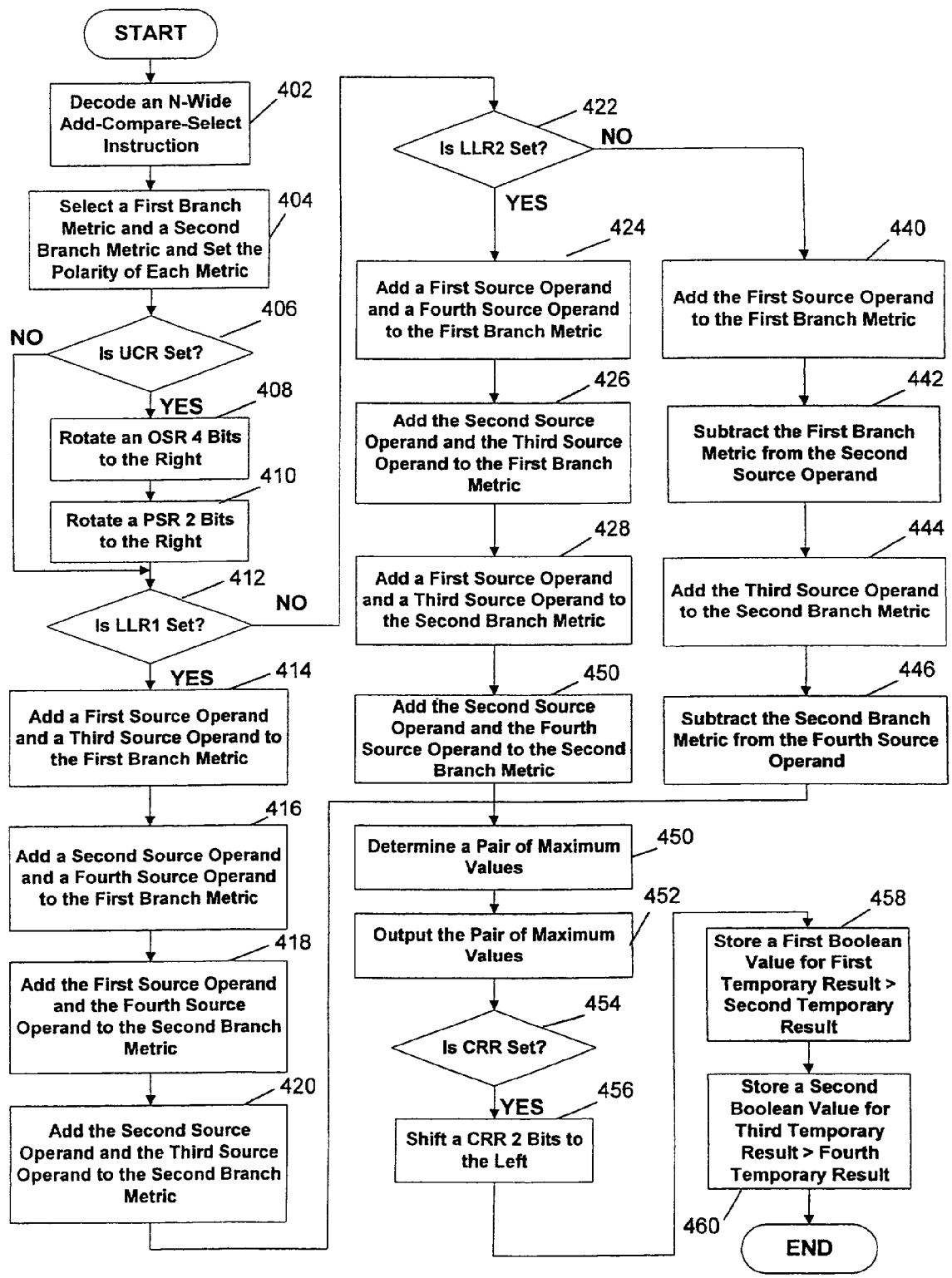
FIG. 4 is a detailed flow diagram of a method for providing a quad add-compare-select instruction in a processor, in accordance with an embodiment of the present invention.

FIG. 4 is a detailed flow diagram of a method for providing a quad add-compare-select instruction in a processor, in accordance with an embodiment of the present invention. In FIG. 4, an instruction may be decoded 402 in a decoder in processor 110 of FIG. 2 as a quad add-compare-select instruction. In FIG. 4, a first branch metric (bm0) and a second branch metric (bm1) may be selected and a polarity for each may be set 404. Whether the control registers (PSR 240 and OSR 245) need to be updated may be determined 406, using the optional UCR variable from the quad add-compare-select instruction. If the control registers (PSR 240 and OSR 245) need to be updated 406, OSR 245 may be rotated 408 by four (4) bits to the right and PSR 240 may be rotated 410 by two (2) bits to the right.

Regardless of whether the control registers need to be updated, whether first LLR1 or second LLR2 options are set, may be determined 412. If the LLR1 value is determined 412 to be set, a first source operand (srcA.1), a third source operand (srcB.1) and the first branch metric (bm0) may be added 414 together to obtain a first temporary value (tmp00). A second source operand (srcA.h), a fourth source operand (srcB.h) and the first branch metric (bm0) may be added 416 together to obtain a second temporary value (tmp01). The first source operand (srcA.1), the fourth source operand (srcB.h) and the second branch metric (bm1) may be added 418 together to obtain a third temporary value (tmp10). The second source operand (srcA.h), the third source operand (srcB.1) and the second branch metric (bm1) may be added 420 together to obtain a fourth temporary value (tmp11). In accordance with an embodiment of the present invention, the above additions may be performed in adders 210, 212, 214 and 216.

Alternatively, in FIG. 4, if the LLR1 value is determined 412 not to be set, whether the LLR2 value is set may be determined 422. If the LLR2 value is determined 422 to be set the first source operand (srcA.1), the fourth source operand (srcB.h) and the first brand metric (bm0) may be added 424 together to obtain the first temporary value (tmp00). The second source operand (srcA.h), the third source operand (srcB.1) and the first branch metric (bm0) may be added 426 together to obtain the second temporary value (tmp01). The first source operand (srcA.1), the third source operand (srcB.1) and the second branch metric (bm1) may be added 428 together to obtain the third temporary value (tmp10). The second source operand (srcA.h), the fourth source operand (srcB.h) and the second branch metric (bm1) may be added 430 together to obtain the fourth temporary value (tmp11). In accordance with an embodiment of the present invention, the above additions may be performed in adders 210, 212, 214 and 216 of FIG. 2.

In FIG. 4, if both the LLR1 and the LLR2 are determined 412, 422 not to be set, the first source operand (srcA.1) and the first branch metric (bm0) may be added 440 together to obtain the first temporary value (tmp00). The first branch metric (bm0) may be subtracted 442 from the second source operand (srcA.h) to obtain the second temporary value (tmp01). The third source operand (srcB.1) and the second branch metric (bm1) may be added 444 together to obtain the third temporary value (tmp01). The second branch metric (bm1) may be subtracted 446 from the fourth source operand (srcB.h) to obtain the fourth temporary value (tmp11). In accordance with an embodiment of the present invention, the above additions may be performed in adders 210, 212, 214 and 216 of FIG. 2.

After the temporary values have been determined, a pair of maximum values may be determined 450 from pairs of the first, second, third and fourth temporary values, (tmp00, tmp01 and tmp10, tmp11). For example, in accordance with an embodiment of the present invention, a first maximum value of the pair of maximum values may be obtained by selecting the first maximum value to be the MAX of the pair of the first temporary value and the second temporary value (MAX(tmp00, tmp01)). Similarly, a second maximum value of the pair of maximum values may be obtained by selecting the second maximum value to be the MAX of the pair of the third temporary value and the fourth temporary value (MAX(tmp10, tmp11)). The pair of maximum values maybe stored 452. For example, the first maximum value may be stored in the low bits of a destination register and the second maximum value may be stored in the high bits of the.. destination register. Whether a CRR value is set may be determined 454. If the CRR option is determined 454 to be set, CCR1 may be shifted 456 by two (2) bits to the left, a first Boolean value (CRR1[2i]) representing the logical result of determining if the first stage first temporary value (tmp00') is greater than the first stage second temporary value (tmp01') may be stored 458, and a second Boolean value (CRR1[2i+1]) representing the logical result of determining if the third temporary value (tmp10') is greater than the fourth temporary value (tmp11') may be stored 460. In accordance with an embodiment of the present invention, the above maximums may be determined in MAX blocks 220, 222, 224 and 226 of FIG. 2.

In accordance with the embodiment of the present invention, a method for providing an N-wide add-compare-select instruction includes decoding an instruction as an N-wide add-compare-select instruction and selecting a plurality of branch metrics. The method also includes combining the plurality of branch metrics with a plurality of source operands and outputting a pair of maximum values.

In accordance with the embodiment of the present invention, a processor including a decoder to decode instructions and a circuit coupled to the decoder. The circuit, in response to a decoded instruction, to select a plurality of branch metrics; combine the plurality of branch metrics with a plurality of source operands; and output a pair of maximum values.

In accordance with an embodiment of the present invention, a computer system including a processor and a machine-readable medium coupled to the processor in which is stored one or more instructions adapted to be executed by the processor. The instructions which, when executed, configure the processor to decode an instruction as an N-wide add-compare-select instruction, where the N-wide add-compare-select instruction has a plurality of source operands. The processor, also being configured to select a plurality of branch metrics; combine the plurality of branch metrics with a plurality of source operands; and output a pair of maximum values.

In accordance with an embodiment of the present invention, a machine-readable medium in which is stored one or more instructions adapted to be executed by a processor, the instructions which, when executed, configure the processor to decode an instruction as an N-wide add-compare-select instruction, where the N-wide add-compare-select instruction has a plurality of source operands. The processor, also being configured to select a plurality of branch metrics; combine the plurality of branch metrics with a plurality of source operands; and output a pair of maximum values.

While the embodiments described above relate mainly to 32-bit data path and 32-bit register-based quad add-compare-select instruction embodiments, they are not intended to limit the scope or coverage of the present invention. In fact, the method described above can be implemented with different sized data types and processing cores such as, but not limited to, for example, 8-bit, 16-bit and/or 32-bit data with 64-bit registers or 8-bit 16-bit, 32-bit and/or 64-bit data with 128-bit registers.

It should, of course, be understood that while the present invention has been described mainly in terms of microprocessor-based and multiple microprocessor-based personal computer systems, those skilled in the art will recognize that the principles of the invention, as discussed herein, may be used advantageously with alternative embodiments involving other integrated processor chips and computer systems. Accordingly, all such implementations which fall within the spirit and scope of the appended claims will be embraced by the principles of the present invention.

What is claimed is:

1. A method for providing an instruction, the method comprising:
    decoding an instruction with a decoder in a processor device as an N-wide add-compare-select instruction, said decoding operation comprises decoding said N-wide add-compare-select instruction as a quad add-compare-select instruction, said quad add-compare-select instruction having a plurality of operands;
    selecting a plurality of branch metrics;
    combining the plurality of branch metrics with a plurality of source operands wherein one of said plurality of branch metrics is combined with at least two source operands of said instruction;
    outputting a pair of maximum values of values from said combining operation; and
    updating a plurality of control registers, if requested by said N-wide add-compare-select instruction wherein said updating operation comprises:
        rotating an operand selection register (OSR) four bits to the right; and
        rotating a polarity setting register (PSR) two bits to the right.

2. The method as described in claim 1 wherein said selecting operation comprises:
    selecting a first branch metric;
    setting a polarity of said first branch metric;
    selecting a second branch metric; and
    setting a polarity of said second branch metric.

3. The method as defined in claim 1 wherein said combining operation comprises:

adding a first source operand and a third source operand to a first of said plurality of branch metrics to obtain a first result;
adding a second source operand and a fourth source operand to said first of said plurality of branch metrics to obtain a second result;
adding a first source operand and a fourth source operand to a second of said plurality of branch metrics to obtain a third result; and
adding a second source operand and a third source operand to said second of said plurality of branch metrics to obtain a fourth result.

4. The method as defined in claim 1 wherein said combining operation comprises:
adding a first source operand and a fourth source operand to a first of said plurality of branch metrics to obtain a first result.
adding a second source operand and a third source operand to said first of said plurality of branch metrics to obtain a second result;
adding a first source operand and a third source operand to a second of said plurality of branch metrics to obtain a third result; and
adding a second source operand and a fourth source operand to said second of said plurality of branch metrics to obtain a fourth result.

5. The method as defined in claim 1 wherein said combining operation comprises:
adding a first source operand to a first of said plurality of branch metrics;
subtracting said first of said plurality of branch metrics to a second source operand;
adding a third source operand to a third of said plurality of branch metrics; and
subtracting said second of said plurality of branch metrics to a fourth source operand.

6. The method as defined in claim 1 wherein said outputting operation comprises:
determining said pair of maximum values from a plurality of results from said combining operation; and
storing said pair of maximum values as a final result.

7. The method as defined in claim 6 wherein said determining operation comprises:
setting a first of said pair of maximum results equal to a maximum of a first result of said combining operation and a second result of said combining operation; and
setting a second of said pair of maximum results equal to a maximum of a third result of said combining operation and a fourth result of said combining operation.

8. The method as defined in claim 7 wherein said storing said pair of maximum values operation comprises:
storing said first maximum result as a plurality of low bits in said final result; and
storing said second maximum result as a plurality of high bits in said final result.

9. The method as defined in claim 8 wherein said plurality of low and high bits are equal to one of:
8 bits;
16 bits;
32 bits; and
64 bits.

10. The method as defined in claim 1 farther comprising:
updating a compare result register (CRR), if requested by said N-wide add-compare-select instruction.

11. The method as defined in claim 10 wherein said updating operation comprises:
shifting said CRR two bits to the left;
storing a first Boolean value indicating whether a first result from said combining operation is greater than a second result from said combining operation; and
storing a second Boolean value indicating whether a third result from said combining operation is greater than a fourth from said combining operation.

12. The method as defined in claim 11 wherein said first and second Boolean values are stored in adjacent locations in said CRR.

13. The method as defined in claim 1 wherein said selecting operation and said combining operation occur in a first processor cycle.

14. The method as defined in claim 1 wherein said outputting operation occurs in a second processor cycle.

15. A processor, said processor comprising:
a decoder to decode instructions, said decoder to decode a quad add-compare-select instruction having a plurality of operands; and
a circuit coupled to said decoder, said circuit, in response to a decoded instruction, to select a plurality of branch metrics,
combine the plurality of branch metrics with a plurality of source operands wherein one of said plurality of branch metrics is combined with at least two source operands of said instruction,
output a pair of maximum values of the combined values,
update a plurality of control registers, if requested by said quad add-compare- select instruction, the update including
rotate an operand selection register (OSR) four bits to the right; and
rotate a polarity setting register (PSR) two bits to the right.

16. The processor as defined in claim 15 wherein said circuit comprises:
a branch metric register (BMR), said BMR to provide said plurality of branch metrics;
a polarity setting register (PSR), said PSR to conditionally set the polarity of each of said plurality of branch metrics;
an operand selection register (OSR), said OSR to control which bits from said plurality of operands are selected for a plurality of source operands;
at least one compare results register (CRR), said at least one Crier to receive generated compare results;
a plurality of 3:1 adders, said plurality of 3:1 adders to combine said plurality of source operands with said plurality of branch metrics to generate a plurality of values;
a plurality of 2:1 MAX blocks coupled to said 3:1 address, said 2:1 MAX blocks to determine maximums between predetermined pairs of said generated plurality of values.

17. The processor as defined in claim 16 wherein said processor is one of a super-scalar processor and a VLIW processor.

18. The processor as defined in claim 16 wherein said processor has a 32-bit data path; and said BMR, said PSR and said plurality of CRRs are 32-bit registers.

19. The processor as defined in claim 16 wherein said plurality of 3:1 adders are 16-bit adders.

20. The processor as defined in claim 16 wherein said plurality of 3:1 adders are implemented in one instruction execute stage.

21. A computer system comprising:
a processor; and
a machine-readable medium coupled to the processor, the instructions which, when executed, configure the processor to
decode an instruction as a quad add-compare-select instruction, said quad add-compare-select instruction having a plurality of operands;
select a plurality of branch metrics;
combine the plurality of branch metrics with a plurality of source operands wherein one of said plurality of branch metrics is combined with at least two source operands of said instruction;
output a pair of maximum values of the combined values;
update a plurality of control registers, if requested by said quad add-compare-select instruction, the update including
rotate an operand selection register (OSR) four bits to the right; and
rotate a polarity setting register (PSR) two bits to the right.

22. The computer system as defined in claim 21 wherein said processor comprises:
a decoder to decode instructions; and
a circuit coupled to said decoder, said circuit configured to execute said decoded quad add-compare-select instruction.

23. The computer system as defined in claim 22 wherein said circuit comprises:
a branch metric register (BMR), said BMR to provide said plurality of branch metrics;
a polarity setting register (PSR), said PSR to conditionally set the polarity of each of said plurality of branch metrics;
an operand selection register (OSR), said OSR to control which bits from said plurality of operands are selected for a plurality of source operands;
at least one compare results register (CRR), said at least one Crier to receive generated compare results;
a plurality of 3:1 adders, said plurality of 3:1 adders to combine said plurality of source operands with said plurality of branch metrics to generate a plurality of values;
a plurality of 2:1 MAX blocks coupled to said 3:1 address, said 2:1 MAX blocks to determine maximums between predetermined pairs of said generated plurality of values.

24. The computer system as defined in claim 22 wherein said processor is one of a super-scalar processor and a VLIW processor.

25. A machine-readable medium in which is stored one or more instructions adapted to be executed by a processor, the instructions which, when executed, configure the processor to
decode an instruction as a quad add-compare-select instruction, said quad add-compare-select instruction having a plurality of operands;
select a plurality of branch metrics;
combine the plurality of branch metrics with a plurality of source operands wherein one of said plurality of branch metrics is combined with at least two source operands of said instruction;
output a pair of maximum values,
update a plurality of control registers, if requested by said quad add-compare-select instruction, the update including
rotate an operand selection register (OSR) four bits to the right; and
rotate a polarity setting register (PSR) two bits to the right.

26. The machine-readable medium as defined in claim 25 wherein each of said select operation and said combine operation occur in a first processor cycle; and said store operation occurs in a second processor cycle.

* * * * *

UNITED STATES PATENT AND TRADEMARK OFFICE
CERTIFICATE OF CORRECTION

PATENT NO. : 7,454,601 B2 Page 1 of 1
APPLICATION NO. : 10/107259
DATED : November 18, 2008
INVENTOR(S) : Gad Sheaffer It is certified that error appears in the above-identified patent and that said Letters Patent is hereby corrected as shown below:

| Column | Line | |
|--------|------|---|
| 12 | 2 | Change "Crier" to --CRR--. |

Signed and Sealed this

Twenty-seventh Day of January, 2009

JOHN DOLL
*Acting Director of the United States Patent and Trademark Office*